INVENTOR:
JOHN H. TURNBULL
BY Kurt Kelman
AGENT

United States Patent Office
3,364,963
Patented Jan. 23, 1968

3,364,963
TOOL FOR PIERCING AND THREADING A WORKPIECE
John H. Turnbull, Kings Heath, Birmingham, England, assignor to G.K.N. Screws & Fasteners Limited, Birmingham, England, a British company
Continuation-in-part of application Ser. No. 460,229, June 1, 1965. This application Oct. 27, 1965, Ser. No. 515,524
Claims priority, application Great Britain, July 8, 1964, 28,053/64
18 Claims. (Cl. 144—32)

ABSTRACT OF THE DISCLOSURE

A hand tool for applying a self-tapping screw to a workpiece, wherein a screwdriver bit is rotatably and axially slidably mounted in a body, an impact member is axially slidably mounted in the body, a first power means in the body rotates the bit, and a second power means drives the impact member into engagement with the screwdriver bit to deliver a desired number of individual impacts to the bit without significant rotation of the screw.

---

This is a continuation-in-part of copending application Ser. No. 460,229, filed June 1, 1965, now abandoned.

This invention relates to a method of inserting threaded fasteners, specifically self-tapping screws, into a sheet metal workpiece.

The invention also relates to a tool for piercing and threading a workpiece, specifically a tool for driving self-tapping screws into a workpiece and more particularly a workpiece comprising, or including, sheet metal.

Hitherto, the general practice, when using self-tapping screws in sheet metal, has been to provide a pilot hole for each screw, by means of a separate drilling or punching operation prior to the application of the screw.

In an endeavour to eliminate this separate operation of providing the pilot hole, there have been proposed some forms of self-tapping screw having a drill point such that the point of the screw will drill the required pilot hole to be followed by the actual driving in of the screw in one operation, but the provision of such special drill point makes these self-tapping screws more expensive to manufacture than ordinary self-tapping screws and, in practice, there is the disadvantage that the drilling of the pilot hole by the point of the screw requires a much higher rotational speed than is normally required for the actual driving of the screw into the pilot hole for the screw to produce its own thread in the sheet metal. Consequently, when these particular screws having drill points are used with power-operated tools, the high rotational speed required for the initial drilling of the pilot hole is frequently too high for the subsequent threading operation and may result in stripping of the thread produced by the screw in the sheet metal.

One object of the invention is to provide a method of inserting threaded fasteners, specifically self-tapping screws, into a sheet metal workpiece, which eliminates the necessity for provision of preformed pilot holes for the screws.

Another object of the invention is to provide a tool for driving self-tapping screws which will eliminate the necessity for any initial separate operation of providing a punched or drilled pilot hole, by causing the screw to pierce its own hole in the workpiece and subsequently rotate the screw to drive it into the workpiece.

A further object of the invention is to provide such a tool having a rotatable screwdriver bit for driving the screw, such bit being also capable of moving axially to project the screw axially and cause its point to pierce the workpiece.

A further object of the invention is to provide a power-operated tool for driving self-tapping screws into a workpiece and having a screwdriver bit with power means for rotating the bit to drive a screw into a workpiece and power means for delivering an impact to the bit in the axial direction to cause the point of the screw to pierce a pilot hole in the workpiece.

The invention is illustrated in the accompanying drawings wherein.

Figures 1, 1A:
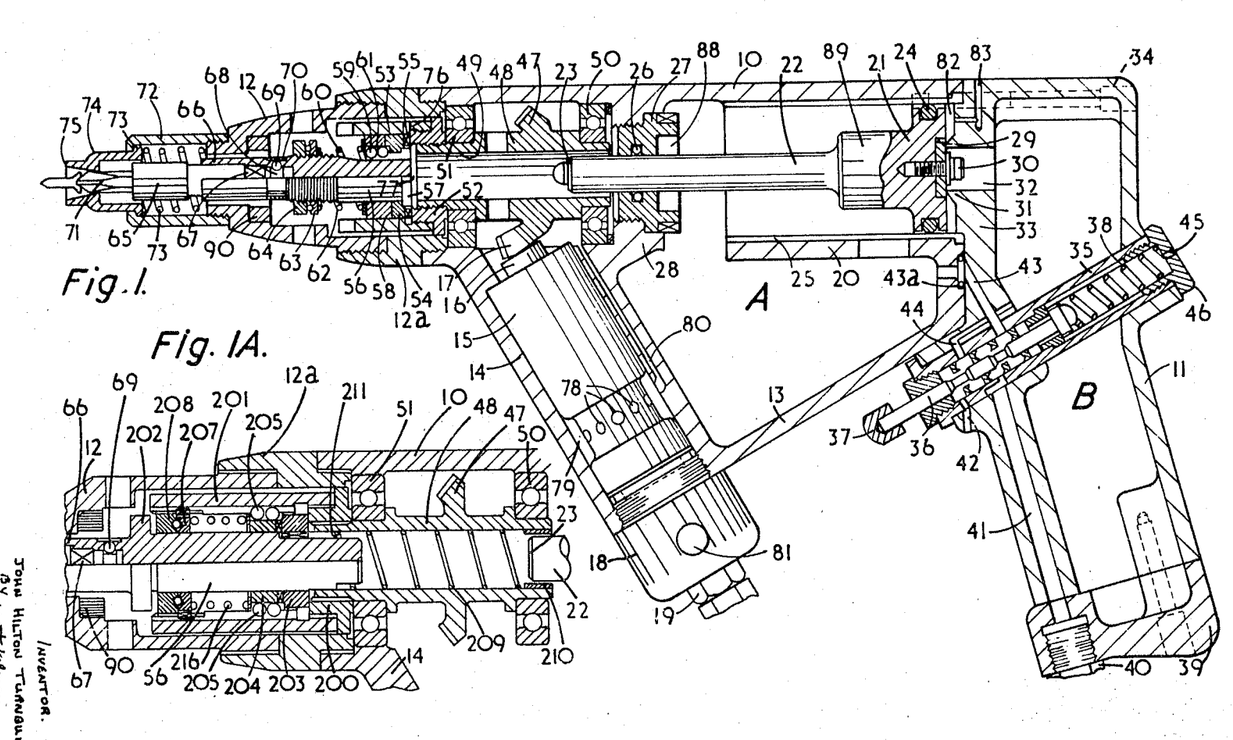
FIGURE 1 is a section through one form of tool for carrying out the method according to the invention.
FIGURE 1A is a similar section through the front end of a modified form of the tool of FIGURE 1.

Referring to the tool shown in FIGURE 1 of the drawings, it will be observed that this is made in the form of a "gun" for hand operation, and broadly comprises a main body part 10 having, at one end, a hollow hand grip part 11 and at the other end a housing 12, for the screwdriver bit, secured to the part 10 by the intermediate part 12a.

The main body part 10 has a section 13 depending below and of hollow formation to provide a chamber A of substantial volume, for the purpose hereinafter referred to.

At the forward end of the section 13 there is formed integrally therewith a cylindrical housing 14 in which is mounted a generally known form of air-operated motor 15 driving a spindle 16 on the outer end of which is fixed a bevel gear 17.

At the lower end, the chamber 14 is closed by an end cap 18 provided with a suitable form of adaptor connection 19 to which may be connected a flexible pipe or tube for supplying air under pressure to operate the motor 15.

Within the chamber A, the main body part has formed integrally therewith an open ended sleeve 20, fitted with a liner sleeve 25, which forms a cylinder within which is slidably mounted a piston 21 formed integrally at the end of a shaft 22, and this combination of piston 21 and shaft 22 forms the impact member of the gun, with the free end 23 of the shaft constituting the actual impact surface of the impact member.

The piston 21 is provided with a rubber or other material sealing ring 24 to form an air-tight seal between the piston and the interior of the liner sleeve 25 and there is also provided a further sealing ring 26 through which shaft 22 passes slideably, such sealing ring 26 being provided in a collar 27 screwed into a bearing member 28 formed integrally in the main body part 10 at the forward end of chamber A.

On its rear face, the piston 21 has a central circular recess in which is mounted a sealing washer 29 of rubber or other suitable material held in place by a screw 30 and this sealing washer 29 makes sealing engagement with a raised annular seating 31 when the piston 21 is in the retracted position, as shown in FIG. 1. The annular seating 31 is provided around a circular opening 32 extending through the wall 33 of the hand grip portion 11 by means of which the hand grip portion is connected to the main body part 10, the two parts being secured together by a suitable arrangement of screws, such as the one indicated in broken lines at 34. A further seal ring 43a is provided between the parts 10 and 11 at the position in the wall where a passage (described hereinafter) provides communication with chamber A.

As mentioned above, the hand grip portion 11 is of hollow form to provide within the interior thereof a chamber B for the purpose hereinafter referred to and also mounted in the hand grip portion 11 is a valve housing 35 in which is mounted a longitudinally slidable valve control spindle 36 provided with an operating button 37 and adapted to provide the control of the impact member shaft 22. The valve spindle 3 is spring loaded by a spring 38 into the position shown in FIG. 1 in which the valve is set for the impact member piston 21 to be held in the retracted position.

The hand grip portion 11 is closed at its lower end by an end cap 39 in which is fitted an adaptor 40 for connection to a flexible tube for supplying air under pressure to the control valve housing 35 and this air is conveyed to the valve housing through the passage 41 extending through the wall of the hand grip portion 11. Also in this wall of the hand grip portion is an exhaust passage 42 leading from the valve housing and further passages 43 and 44 respectively leading from the valve housing to the chambers A and B. A further exhaust outlet is provided by the passage 45 in an end cap 46 which closes the end of the housing 35 of the valve.

The internal construction of the valve is of a generally known form and the function and operation of the valve appears clearly from the description given with respect to FIGURES 2 and 3 hereinafter.

The bevel gear 17 driven by the air motor 15 is in constant mesh with a bevel gear 47 formed on the outside of a sleeve 48 which has an axially extending circular cross section passage 49 through which the shaft 22 of the impact member passes during operation of the gun.

The sleeve 48 is rotatably supported at its ends in rotary anti-friction bearings 50 and 51 and its forward end projecting beyond the bearing 51 is externally threaded and has mounted thereon a flanged collar 52 having an externally threaded portion upon which is mounted the sleeve 53 forming a housing for the clutches hereinafter described.

The forward end of collar 52 has dog teeth thereon adapted to mesh with dog teeth on a clutch plate 54 and these two sets of dog teeth constitute a dog clutch indicated at 55 for clutching the rotatable sleeve 48 to the screwdriver bit assembly hereinafter described.

The screwdriver bit assembly comprises a shaft 56 having a flange 57 at its rearward end, the outer face of this flange forming an abutment surface which is engaged by the impact surface 23 of the impact member during operation of the gun. The aforementioned plate 54 is mounted about the shaft 56 adjacent the flange 57 and this clutch plate engages operatively with a further clutch plate 58 also mounted about the shaft 56 and drivingly connected thereto by means of a number of sets of balls 59, each set engaging in a longitudinally extending groove 60 in the shaft 56 and a corresponding groove 61 in the interior of the clutch plate 58. Thus clutch plate 58, when rotated, transmits rotary motion to the shaft 56 of the screwdriver bit assembly and is also capable of sliding relatively to the shaft against the resistance of the clutch spring 62 which is disposed about the shaft 56 and at one end engages the clutch plate 58 whilst its other end engages a washer 63 mounted upon the shaft 56 and held by a lock nut 64.

The two clutch plates 58 and 54 form a generally known form of slipping clutch of the type provided in power operated screwdrivers to prevent the torque applied to the screwdriver bit exceeding a predetermined maximum, which might result in stripping of the thread when the screw is being driven into a metal sheet. When torque above such predetermined maximum is encountered, the drive to the shaft 56 is disconnected when clutch plate 58 moves away from clutch plate 54 and compresses the clutch spring 62, the two plates being automatically re-engaged when the overload torque is removed.

The screwdriver bit assembly comprises the spindle 65 which is releasably and non-rotatively engaged in a sleeve portion 66 formed on the outer end of the shaft 56. The spindle 65 has an hexagonal cross section part 67 which engages a part of corresponding cross section in the sleeve 66 and a reduced neck portion 68 which is non-positively engaged by a number of balls 69 held resiliently in engagement with the reduced neck 68 by a spring ring 70.

The bit proper extends from the end of the spindle 65 and different sizes of bit 71 may be employed according to the size of screw being used by pulling the spindle 65 out of the sleeve 66 and replacing it with another spindle having a different sized bit on its end.

The housing 12 is provided with an externally threaded part on its forward end on which is mounted a sleeve 72 containing a spring 73, one end of which acts against the sleeve 66 and the other end of which engages the flanged end 74a of a bit housing 74 which normally covers the projecting bit 71. When the gun is being used and a screw is being driven into the workpiece, the forward face 75 of the bit housing engages the surface of the workpiece and the bit moves axially through and out of the housing 74 with consequent compression of the spring 73 which returns the bit housing 74 to its extended position when the gun is not in use.

Referring back to the sleeve 53, it will be observed that this is provided with a small bore hole 76 extending through its wall and providing a passage for air from the space 77 for the purpose now described.

The exhaust air from the air motor 15 passes out of its casing through holes 78 and, from the annular space 79, such exhaust air passes through the passage 80 in the wall of housing 14 into the space 77 above referred to. This air entering the space 77 creates sufficient pressure on the abutment surface of the flange 57 of shaft 56 to hold this in a forward position in which the teeth of dog clutch 55 are disengaged. Normally, a light mechanical spring would be provided for this purpose but in order to save space and avoid complication, use is made of the exhaust air from the air motor to provide the clutch spring normally holding the dog clutch 55 disengaged.

The small bore xhaust hole 76 permits the air to escape from the space 77, which is necessary in order to guard against any build-up of pressure in the space 77 to a value sufficient to constitute a back pressure which would result in stalling of the air motor 15.

When the gun is being used, the axial pressure applied to the shaft 56 when the screw is engaged with the workpiece is sufficient to overcome the relatively light pressure applied by the air in space 77 and thus engage the teeth of dog clutch 55.

The control of the air motor 15 is by means of a control valve operated by a control button 81, such valve being of generally known form and not requiring further description.

Also it will be observed that the annular space 82 between the impact member piston 21 and the wall 33 is open to the atmosphere through a small bore exhaust passage 83 extending through the wall of the hand grip portion 11, such passage being provided for the purpose hereinafter referred to.

Figure 2:
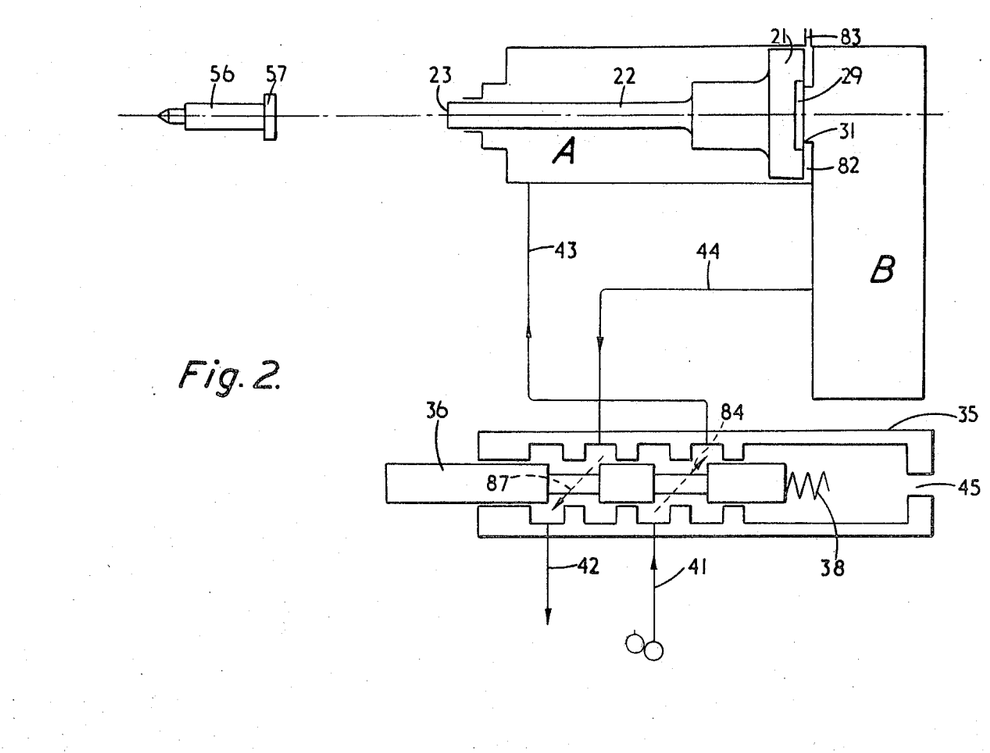
FIGURES 2 and 3 are line diagrams illustrating the operating sequence of the tool.
Figure 3:
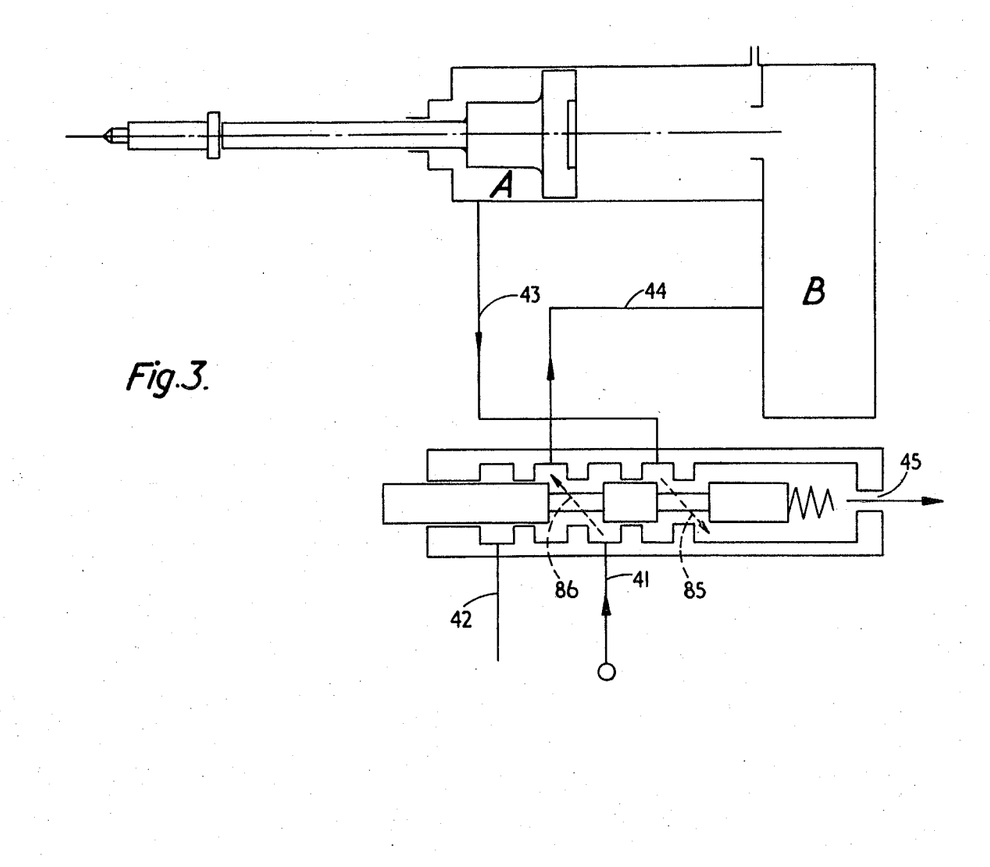

Refering now to FIGURES 2 and 3, there is shown a diagrammatic layout of the control valve spindle 36, chambers A and B, impact member shaft 22, and screwdriver shaft 56, with its flange 57 providing the abutment surface for engagement by the impact surfaces 23 of the impact member, together with the air lines to and from the valve and to and from the chambers A and B.

FIGURE 2 shows the position of the valve and impact member shaft 22 when the gun is in the normal "at rest" condition and, in this condition, air under pressure entering via passage 41 passes through the valve as indicated by the arrow 84 and via the passage 43 into the chamber A where the air pressure in chamber A maintains the impact member piston 21 with its sealing washer 29 in sealing engagement with the seating 31.

When the control valve is operated, the spindle 36 is pushed inwardly to the position shown in FIGURE 3, the space within chamber A is connected via passage 43 through the valve as indicated by arrow 85 to exhaust via the passage 45 and the incoming air under pressure from passage 41 is directed through the valve, see arrow 86, and into the chamber B via the passage 44. As the pressure in chamber A drops, pressure commences to build up in chamber B until, after a short interval of time (about half a second in practice), the pressure in chamber B is high enough as compared with the dropping pressure in chamber A for air to leak past the sealing ring 29 and thus provide pressure acting upon the full surface area of the rear face of impact member piston 21. This results in a sudden impact upon the piston 21 to drive the impact member shaft 22 forwardly to strike the driver shaft 56 and cause the point of the screw held by the driver bit to pierce the workpiece.

When the valve spindle 36 is released and the spring 38 returns the valve to the position of FIGURE 2, chamber B is connected to exhaust via passage 44 and through the valve as indicated by arrow 87 to the passage 42, and once again the air under pressure from passage 41 is directed into chamber A via the passage 43 so that the pressure in chamber A commences to build up again and returns the piston 21 to its retracted position of FIGURE 2.

Thus, successive operations of valve spindle 36, as above described, produces a succession of impacts of identical magnitude, the actual magnitude of the impact being dependent upon the pressure of the compressed air supply at 40. In practice the air supply is obtained from a suitable source and fed to the tool through a known pressure regulating valve or reducing valve such as will, in known manner, ensure a constant pressure supply to the tool unaffected by any fluctuation in pressure which may from time to time occur in the source of supply.

The provision of the small bore vent hole 83 is to prevent air being compressed in the annular space 82 when the piston is being returned, as above described; without such small bore vent 83 air trapped in the annular space 82 would exert an initial pressure on the rear face of the piston 21 and this would have an adverse effect upon the provision of a sudden impact when the pressure in chamber B rises to a certain value.

In order to prevent damage to the gun should the valve spindle 36 be operated when no screw is being driven into the workpiece and thus no resistance is provided to the impact of the impact member shaft 22, the following two precautionary features are incorporated.

Firstly, the collar 27 has a central recess 88 in its rearward end, which is of an interior diameter sufficient to accommodate the enlarged portion 89 of the impact member shaft 22, so that, as this enters the recess 88, the air trapped in the recess provides a cushioning effect to decelerate the impact member.

Secondly, the housing 12 is fitted in its forward end with a rubber buffer ring 90 which is engaged by the lock nut 64 on the spindle 56 at the forward end of the axial stroke of this spindle.

Hence, if the gun is operated against no resistance, the impact of the impact member shaft 22 is cushioned by the air pocket in the recess 88 and although the impact member will still strike and drive the bit spindle 56, the impact of this spindle is cushioned by the rubber buffer ring 90.

The volume of chamber A has to be sufficiently large as compared with the swept volume of piston 21 to ensure that, when impact takes place, there is no undue resistance offered to the movement of piston 21. It will be appreciated that, if only a small volume were provided for chamber A, the air in such chamber being rapidly compressed by the rapid movement of piston 21 would offer a substantial resistance to the movement of the piston and have an adverse effect upon the impact.

FIGURE 1A shows certain modifications to the gun shown in FIGURE 1; the majority of the construction is the same and to facilitate understanding of the modifications the same reference numerals are used in FIGURE 1A for those parts which are the same as in FIGURE 1. So far as the differences are concerned, the rotary sleeve 48 has secured on its end a collar 200 to which is fixed the one end of the sleeve 201 within which the shaft 56 of the screwdriver bit assembly is disposed, this shaft having a radially extending flange 202. Mounted upon shaft 56 are the two plates 203, 204 forming a slipping clutch, the plate 203 being keyed to the shaft 56 and the plate 204 being keyed to the sleeve 201 by the sets of balls 205 working in cooperating slots within the sleeve 201 and on the periphery of plate 204. Torque is transmitted from sleeve 201 to shaft 56 via the overload slipping clutch 203, 204. The spring 216 for the clutch acts between the plate 204 and washer 207 which is keyed to the sleeve 201 and held in place by the bush 208 threaded into the end of sleeve 201.

To guard against damage or injury if the gun is operated without a screw in position against a workpiece, a spring 209 acts between an abutment ring 210 fitted inside rotary sleeve 48 and a shoulder 211 on the end of shaft 56 so that, with the gun at rest, the spring 209 holds the shaft 56 in the forward position to escape the effect of impact from impact member shaft 22. When the screw is in position and pressed against the workpiece, shaft 56 moves into the operative position, compressing spring 209. Operative forward impact of shaft 56 is cushioned by rubber ring 90.

Figure 4:
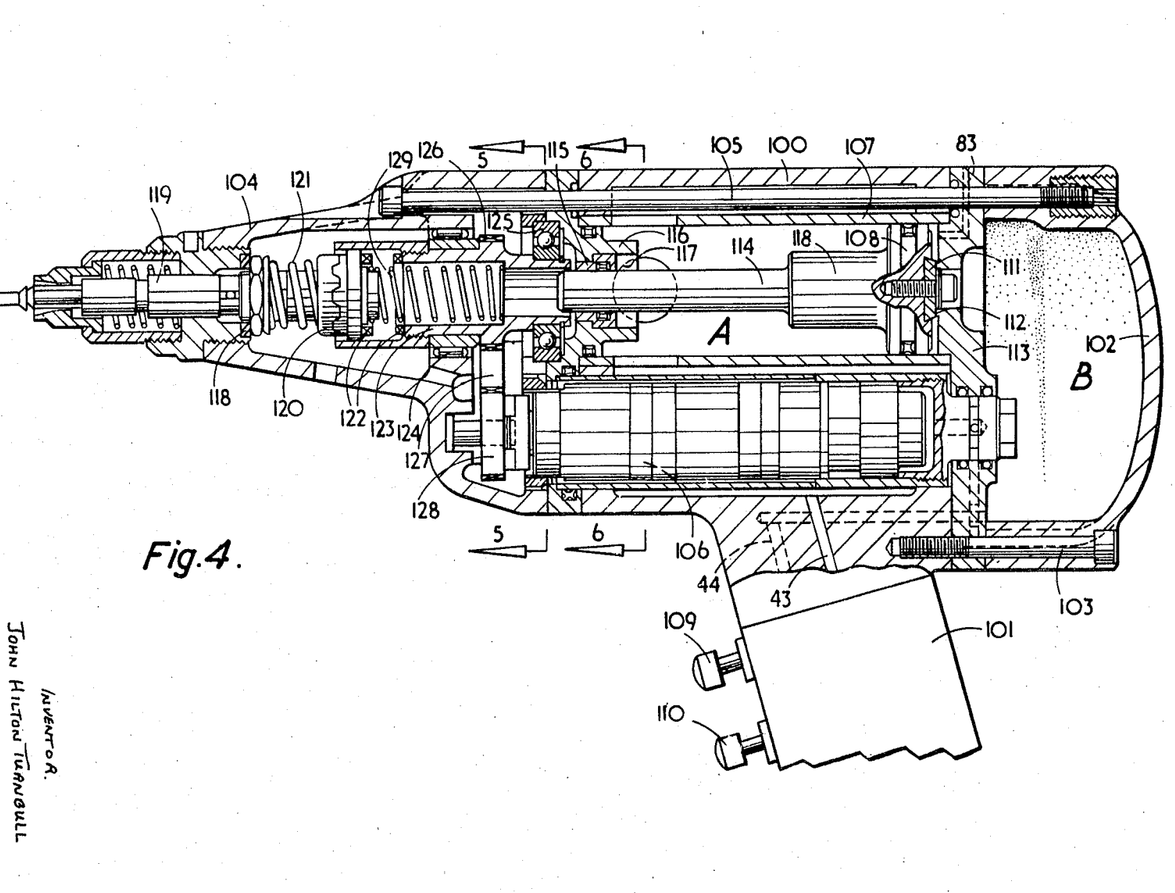
FIGURE 4 is a section of a modified form of tool.
Figure 5:
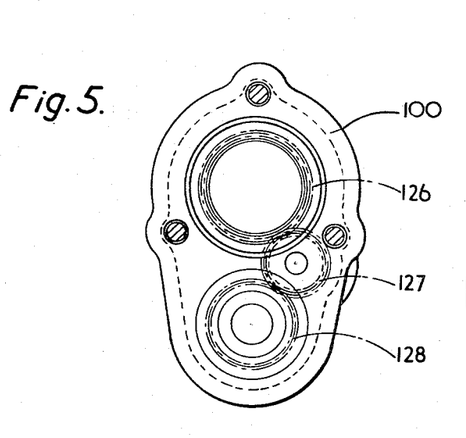
FIGURE 5 is a section on the line 5—5 of FIGURE 4.
Figure 6:
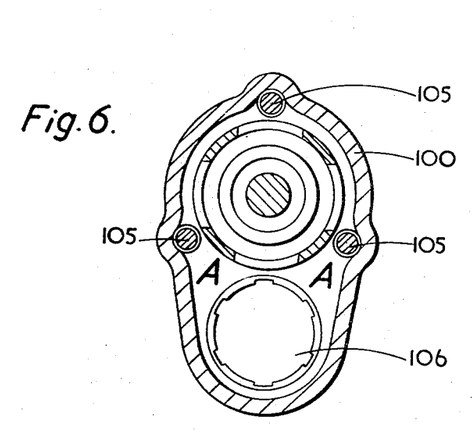
FIGURE 6 is a section on the line 6—6 of FIGURE 4.

Referring now to the modified form of tool shown in FIGURES 4, 5 and 6, this is in many respects similar to the tool previously described and in particular comprises a main body part 100 and a hand grip part 101 but in this case the chamber B is provided in a secondary body part 102 secured to the rear end of the main part 100 by suitable screws such as 103 whilst the cap part 104, which houses the driver bit at the front end of the tool, is secured to the other parts by the elongated bolts 105.

In this tool, the air motor 106 for providing the drive to rotate the driver bit is located in the lower part of the main body 100 so as to have its axis parallel to the axis of the driver bit and the cylinder 107 in which works the piston 108 of the impact member is fixed in the main body 100 immediately above the air motor 106. The chamber A therefore comprises the space within the cylinder 107 and also, as shown in FIGURE 6, the space outside this cylinder and around the exterior of the air motor 106, this space being provided so as to ensure sufficient volume in the chamber A for the purpose hereinafter referred to.

The hand grip portion 101 incorporates a control valve 109 for controlling the supply of air under pressure to the chambers A and B and a further control valve 110 for controlling the air supply to the motor 106. The valve 109 is not shown in detail, being similar in construction to the control valve described for the previous form of tool and operating in the same manner. In FIGURE 4, like reference numbers are used to refer to the passages from the control valve 109 which correspond to the passages in the previously described construction. Thus, passage 44 provides communication to the chamber B from control valve 109 and passage 43 provides communication between the control valve and chamber A.

The control valve 110 is of generally known form and is not shown in detail.

As with the previously described construction, the piston 108 has a rubber or like sealing ring 111 secured to its rear face and having sealing engagement with an annular seating 112 formed in the partition 113 between the main body 100 and the secondary body 102 and there is also provided the vent passage 83 to allow escape of air from the annular space between the rear of the piston 108 and the partition 113.

The shaft 114 of the impact member is, as before, formed integrally with the piston 108 and this shaft moves axially through the bearing 115 supported in the internal bush 116 provided, as before, with the recess 117 to form an annular pocket to accommodate the enlarged part 118 of the impact member whereby air, trapped in the pocket 117, serves to cushion the impact of the spindle 114 so as to avoid possible damage to the gun if it is operated without a screw in position to act as resistance to the impact. As a further precaution, as before, the rubber ring 130 is provided in the cap 104.

The construction of the screwdriver bit 119 is the same as previously described for the construction of FIGURE 1, and in particular there is provided the slipping clutch 120 with its co-operating spring 121 and the dog clutch 122 operating between one part of the slipping clutch and the sleeve 123 which is rotatably supported in rotary anti-friction bearings 124 and 125 and is formed with external gear teeth 126 meshing with an intermediate pinion 127 itself driven by a pinion 128 fixed on the drive shaft of the air motor 106.

It will be observed that in this form of tool, the dog clutch 122 is provided with a spring 129 housed within the sleeve 123 as in this arrangement there is sufficient space available to provide a mechanical spring for the dog clutch instead of making use of an air spring, as in the previously described construction. Thus in this arrangement, no use is made of the exhaust air from the air motor 106. When the gun is in use, the manual pressure exerted in the axial direction of the screwdriver bit is sufficient to compress the spring 129 for the dog clutch 122 to be engaged so that the drive can be transmitted from the air motor 106 to the screwdriver bit.

The operation of the tool shown in FIGURES 4, 5 and 6 is similar to that previously described.

With the gun at rest, the pressure of air in chamber A is holding the piston 108 at the rear end of the cylinder 107 at the position shown in FIGURE 4, with the rubber ring 111 seating upon the annular seating surface 112. When the control valve 109 is pushed inwardly, air under pressure is admitted into chamber B via the passage 44 and the pressure in chamber B starts to build up whilst air is exhausting from chamber A via passage 43. After a short while (about half a second), the pressure in chamber B rises high enough for air to leak past the sealing ring 111 and the pressure of air in chamber B comes into operation on the full surface area to the rear of the piston 108, resulting in the sudden impact and rapid acceleration of the piston to drive the impact member forwardly and deliver the impact to the screwdriver bit 119.

When the control valve 109 is released, air commences to exhaust from chamber B via passage 44 whilst air under pressure is admitted to chamber A to return the piston 108 to the rear of its cylinder 107, the air behind the piston being able to escape also through the vent 83 to prevent air under pressure being trapped in the annular space behind the piston when the sealing ring 111 again seats upon its co-operating sealing surface 112.

The control valve 110 can then be operated to rotate the air motor and drive the screwdriver bit 119 for the screw to be threaded into the workpiece.

An important characteristic of the tool devised for carrying out the method of the invention is that the magnitude of the impact which is delivered to a screw can be predetermined and the tool set to deliver that impact so that, where a plurality of identical screws are being driven with one tool, there is the certainty that all screws receive the same impact. In the main, the use of self-tapping screws in sheet metal is to be found in assembly line and similar work where large numbers of identical screws are being driven. It will be appreciated that, in the two examples of tool herein described, the magnitude of the impact can be adjusted by appropriate adjustment of the pressure of the air supply to the tool.

When driving a screw into a workpiece which consists only of one or more sheet metal members, the practice will normally be to operate the gun so as first to provide the impact for the screw point to pierce the workpiece and then to rotate the screwdriver bit to drive the screw into the workpiece and cause it to produce its own thread in the normal way. However, in certain cases (e.g. where the workpiece has a curved surface), it may be advantageous to operate the air motor momentarily to rotate the screw against the workpiece before applying the impact so as to cause the extremity of the point to create a minute dimple in the surface of the workpiece. This acts to centre the screw and guards against the screw sliding sideways when the impact is applied. In such a case, in actual practice, it makes no difference to the operation of the method if the air motor should be kept running when the impact is delivered because the impact is so sudden that, at the actual instance of impact, there is no significant rotation of the screw.

Also in cases where the workpiece comprises a metal sheet having a facing of some softer material, such as asbestos board or a plastics material, the gun may be operated so as to first rotate the air motor to drive the screw in the normal way through the relatively softer material until the resistance of the sheet metal is encountered whereupon the gun would then be operated as above described to deliver an impact to the screw to cause it to pierce the sheet metal and subsequently rotate the screwdriver bit to drive the screw home. Alternatively, it may be preferred to operate the gun so as to deliver an impact to the screw to first drive it straight through the softer material followed by a further impact to pierce the metal sheet.

The basic requirements of a screw, to be used in carrying out the method of the invention, are a cylindrical threaded shank having a full thread thereon and a tapered threaded portion which terminates in an unthreaded metal piercing point. A preferred form of screw, with which the most satisfactory results have been achieved in practice so far, is that shown in FIGURES 7–11, and which forms the subject of application Ser. No. 460,759, filed June 2, 1965. It is to be understood, however, that acceptable results can be obtained with the use of other forms of screws having the above mentioned basic requirements, as well as the preferred form herein referred to.

So far as the head of the screw is concerned, apart from the requirement that it must have non-rotatable engagement with the screwdriver bit, it may vary in shape and form considerably from that shown in FIGURES 7–11. However, for the reasons mentioned hereinafter, it is also preferred to make use of the known form of screwdriver bit-engaging recess shown in FIGURES 7–11.

The screw shown in FIGURES 7–11 has a head 300, a cylindrical shank 301 having a hardened thread 304 of full form thereon and a tapered portion 303, also threaded, and terminating in a metal-piercing point 302. The point 302 is of pyramidal form having flat sides 305 and a base 320, where it joins the tapered portion 303, which is of diamond shape in cross-section, with the diagonal between corners 323—323 being longer than the other diagonal (see FIGURE 10). As will be observed, a two-start thread is provided and is so arranged that the start of each thread is arranged to coincide with one of the corners 323 at the ends of the maximum diagonal of the piercing point.

Figure 9:
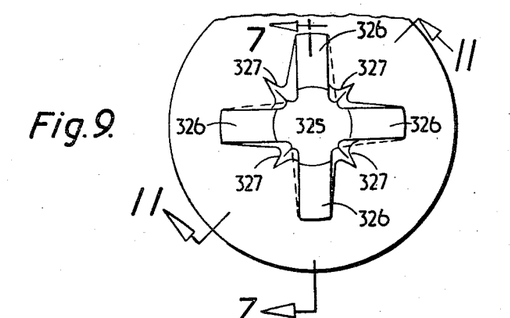
FIGURE 9 is an end view, looking at the head of the screw shown in FIGURES 7 and 8, in which figures the head of the screw is shown in section on the line 7—7 of FIGURE 9.
Figure 10:
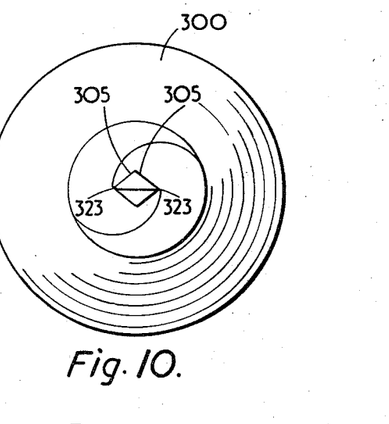
FIGURE 10 is an end view of the screw, looking at the point end.
Figure 11:
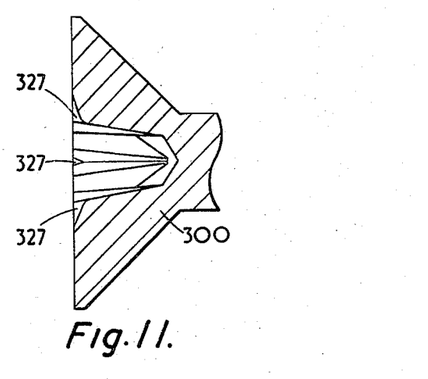
FIGURE 11 is a fragmentary view of the head of the screw on the line 11—11 in FIGURE 9.

The head 300 has a screwdriver bit engaging recess of the known form comprising a central cavity 325 and four driver wing-engaging grooves 326 radiating outwardly from the central cavity of the recess. The recess, at a position intermediate each two circumferentially adjacent grooves 326 is formed with a valley 327 of V-form in cross-section which slopes downwardly and inwardly with respect to the screw axis, and wherein the side walls of the recess grooves 325 are substantially vertical.

The screwdriver bit for use with a screw having the above described form of recess has an operative end for engaging said recess, comprising a central core and four equi-angularly spaced wings radiating therefrom, each adapted to engage within one of the four radially extending grooves 325 of said recess, the side faces of the wings being substantially vertical and the core, at positions intermediate each two circumferentially adjacent wings, being formed with an outwardly extending rib of V-form, the cross-section of which decreases in a downwards direction towards the end of the screwdriver bit.

Such form of recess ensures easy entry of the driver bit in the recess, a high driving torque capacity for the screw and driver bit and elimination, or virtual elimination, of any tendency for driver wobble or cam-out during actual driving of the screw. When such a screw is used with the tools herein described and claimed, this particular form of recess in the screw head and co-operating form of driver bit contributes greatly towards ensuring that the screw and driver bit are correctly centred (i.e. in strict axial alignment) and that the bit is firmly bottomed in the recess so that, in addition to correct and satisfactory threading of the screw into the workpiece, it is ensured that there will be delivered to the screw an impact in which the line of force is correctly along the screw axis so that there is no tendency for the screw to tilt when the impact is received which would produce a malformed hole in the workpiece.

Further, with a screw having a recess as above described, the cross-section of the driver bit is increased as compared with other forms of cruciform bit, thus providing added strength for the screwdriver bit which, in this instance, is subject to axial impact as well as torque.

FIGURES 7 to 13 illustrate the manner in which the method according to the invention operates to overcome the drawback associated with the use hitherto of self-tapping screws in sheet metal, as hereinbefore explained.

Figure 7:
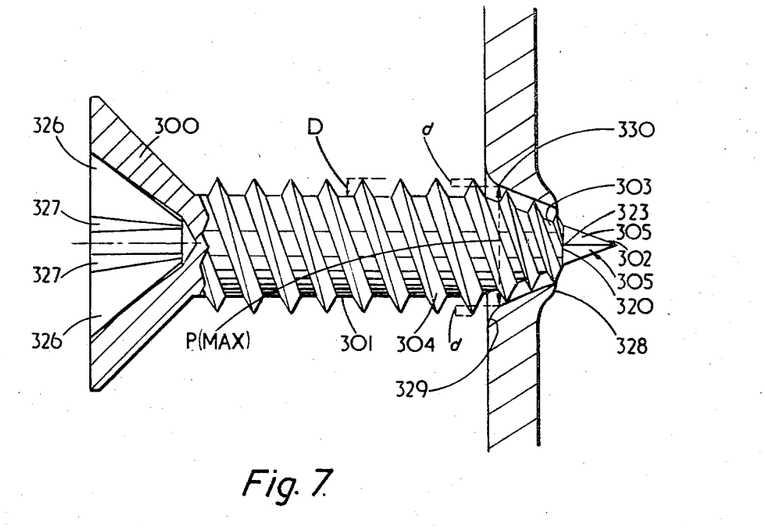
FIGURE 7 is a side view, partly sectioned, showing the initial stage of a screw which has been given an impact to cause it to pierce a pilot hole in a metal sheet but before the operation of rotating the screw has commenced; this figure being drawn to show the preferred case where the magnitude of the impact is the predetermined maximum permissible.
Figure 8:
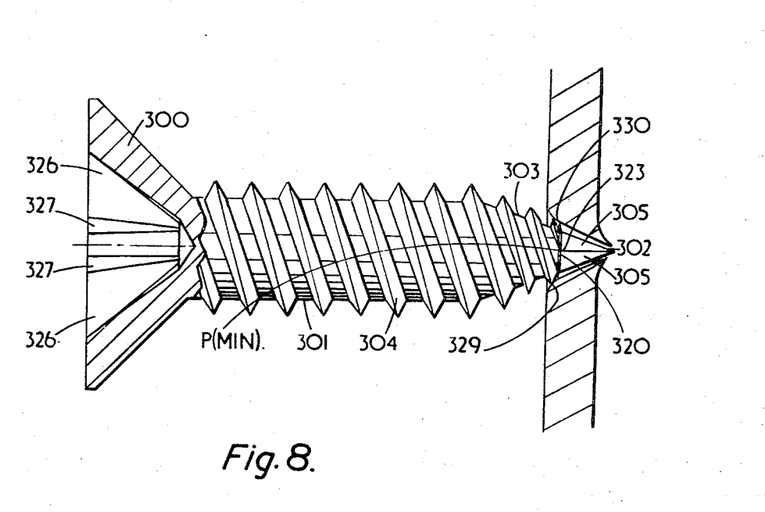
FIGURE 8 is a view similar to FIGURE 7, but showing the case where the magnitude of the impact is the predetermined minimum permissible, for the same dimensions of screw and sheet as shown in FIGURE 7.

For any particular size of screw and with a particular thickness of metal sheet, the magnitude of the impact must lie within certain limits, illustrated in FIGURES 7 and 8 which show the position of the screw in the metal sheet after maximum permissible and minimum permissible impact. Considering the case of FIGURE 7, the impact delivered to the screw has caused the point 302 to pass right through the sheet until the whole of the point 302 is beyond the outer surface.

As will be observed from FIGURE 7, some metal of the sheet is displaced in the direction of movement of the screw and appears as an annular bulge 328 on the rear surface of the sheet. The metal around the opening on the other (front) surface is stretched by the force of the impact and this has the effect of forming a bell-mouth entrance to the pilot hole, as indicated at 329 in FIGURE 7 and in FIGURE 8. The pilot hole is of tapered configuration and extends from the inner end of this bell-mouth from the point indicated at 330 in FIGURE 7 and in FIGURE 8. In referring herein to the "diameter" of the pilot hole it is the dimension P, measured at the point 330 which is to be taken, i.e. the diameter of the larger end of the tapered pilot hole.

Referring to FIGURE 8, in carrying out the method of the invention the magnitude of the minimum permissible impact is predetermined such that it is sufficient to advance the piercing point 302 into the metal sheet to form a pilot hole which is of a diameter P (min.) sufficiently large to receive and engage with the start of the screw thread on the tapered threaded portion 303. In the case of the two-start threaded screw of FIGURES 7 and 8, the start of each thread is at 323, on diametrically opposite sides of the tapered portion. In the case of a single start thread there will, of course, be only one start corresponding to the point 323. As shown in FIGURE 8, the diameter P (min.) of the pilot hole is such that the start 323 of each thread has just entered the pilot hole and the portion of thread immediately adjacent each start is in engagement with the pilot hole. This engagement, brought about by the force of the impact, impresses the said portion of thread into the metal of the pilot hole and, whilst this impression may be only of a slight degree, it is sufficient to ensure that, when rotation of the screw is commenced, with axially directed pressure maintained upon the screw, the threads will immediately bite into the metal of the sheet to initiate the threading-in operation and axial advancement of the screw.

In practise, the design of the tool permits operation of the control to rotate and drive the screw to follow immediately upon the delivering of the impact, so that there is no break in the axial pressure maintained upon the screw and no possibility of this initial impression engagement between the thread and the pilot hole being interrupted.

Figure 13:
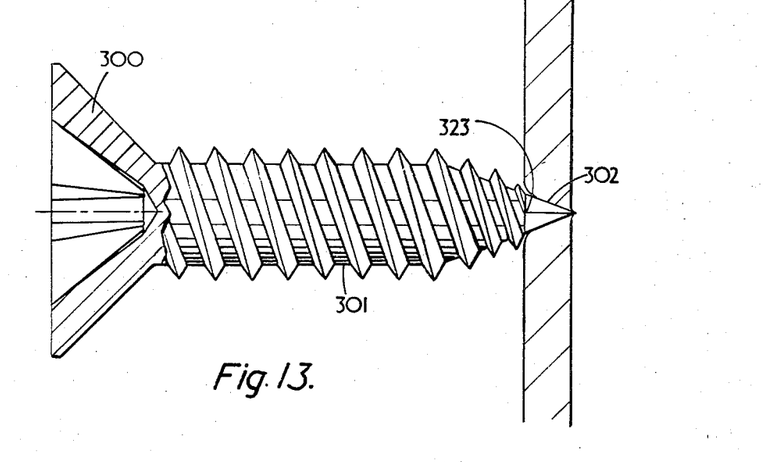
FIGURE 13 is a view similar to FIGURE 8 but showing what happens when an impact less than the predetermined minimum permissible is used.

FIGURE 13 illustrates the position which one obtains if the impact is less than the predetermined minimum permissible. The pilot hole diameter is less than the minimum diameter P (min.) and thus the start 323 of the thread is not engaged in the pilot hole and, when rotated, the screw will spin in the entrance to the pilot hole with the start of the thread being unable to bite into the metal.

Figure 12:
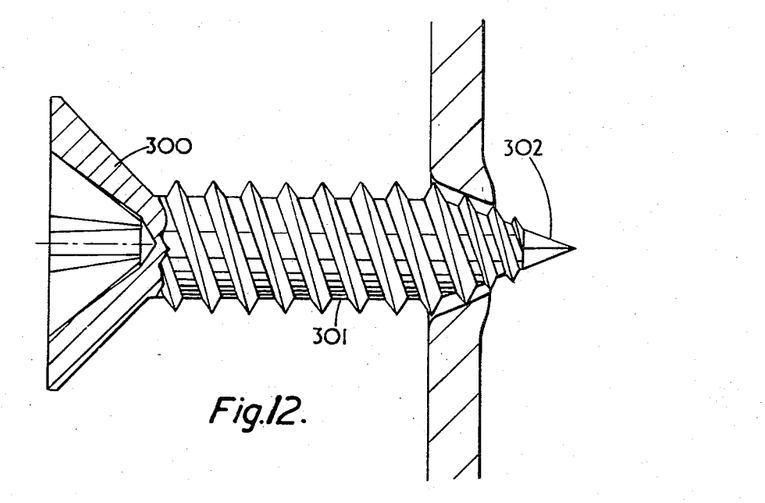
FIGURE 12 is a view similar to FIGURE 7 but showing what happens when an impact in excess of the predetermined maximum permissible is used.

Referring now to FIGURES 7 and 12, the magnitude of the impact must not be so great as to cause the point to pierce a pilot hole of such depth and diameter that, when the screw is rotated to drive it home under its designed driving torque, there will result stripping of the screwthread formed on the interior of the pilot hole. Thus, the maximum permissible impact should be such that, as a result of such impact, there is produced a pilot hole which will receive the full thread on the cylindrical shank of the screw in penetrating engagement with the wall of the pilot hole when the screw is rotatably driven under its designed driving torque. Preferably, when the screw is finally driven home, there should be no less than a certain specified amount of the radial depth of the full thread of the screw in penetrating engagement with the wall of the pilot hole. This preferred state of affairs is illustrated in FIGURE 7.

In FIGURE 7, the impact has caused the point 302 to penetrate a pilot hole of diameter P (max.) which is defined with reference to the dimension D which is the radial depth of the full thread on the cylindrical shank 301 and the dimension $d$ which is the depth to which the first full thread on the cylindrical shank, immediately adjacent the tapered threaded portion, will penetrate into the metal when the screw is rotated to advance it into the pilot hole and said first full thread comes into engagement with the wall of the pilot hole at the position 330. It will be apparent from FIGURE 7 that when the screw is rotated and the first full threads on the shank 301 come into engagement with the wall of the pilot hole, such first full threads will penetrate the wall to the depth $d$ and thus, as the pilot hole is tapered, when the screw is finally driven home there will be a radial depth of penetration of the thread on the shank 301 which is no less than $d$. To achieve the best possible results in practice when driving a plurality of identical screws in succession, such as in continuous assembly line work, and taking into account variations in screw dimensions due to normal manufacturing tolerances, the diameter P (max.) of the pilot hole should not be so great that $d$ is less than 30% of D.

In its broadest aspect, in carrying out the method according to the invention, the maximum permissible magnitude of the impact should not be so great as to produce a pilot hole so large that the final driving of the screw will result in stripping of the thread, as hereinbefore explained. Such a case is illustrated in FIGURE 12 from which it will be observed that the diameter of the pilot hole is equal to, or approximately equal to, the major diameter of the full thread on the shank 301 such that, when the screw is rotated to drive it home there will be little, or no penetration into the wall of the first full threads on the shank as these enter the pilot hole, and such that, despite the tapered nature of the pilot hole, there will be insufficient penetration of the wall of the pilot hole over its whole length to prevent stripping of the thread if an attempt is made to apply full driving torque to drive the screw fully home.

For any given size of screw to be used with a given thickness of metal sheet, there can be determined the magnitude of impact required to produce the preferred pilot hole of maximum permissible diameter, P (max.) FIGURE 7, and the magnitude of impact required to produce the pilot hole of minimum permissible diameter, P (min.) FIGURE 8, so that the tool can be set to deliver an impact of predetermined magnitude falling between the maximum and minimum values. In the case of the pneumatically operated tools described herein, this is achieved by adjustment of the pressure of the air supply and, in the case of guns operated by other power means, by appropriate adjustment of the mechanism or means for delivering the impact to the driver bit.

Hence where a plurality of identical screws are to be inserted into a sheet metal workpiece, such as on an assembly line, the tool can be set to deliver the same predetermined impact successively to each screw to thereby ensure the correct driving of each screw.

In practice, the magnitude of the impact for any particular size of screw may be selected so as to be midway between the maximum and minimum values or closer to one or the other of these values, dependent upon the thickness of the sheet in which the screw is to be used and on other factors such as the hardness of the metal and the substance thereof. Practical experience will determine the optimum value of magnitude of impact for any particular case.

Furthermore, in some cases it may be desirable to deliver the impact to the screw in two or more separate stages involving two or more successive operations of the tool and thus two or more successive impacts. Such may be desirable for example, for very thick sheet metal where a single impact of the desired magnitude may be considered to be too heavy and liable, possibly, to damage the head of the screw, or it may possibly be beyond the range of the particular tool available. Again, it may be the case that the metal sheet is very thin and one impact of the desired magnitude may cause undesirable distortion of the area of the sheet surrounding the pilot hole. It is to be understood that the expression "predetermined impact" as used in the appended claims is to be taken as including not only the case of a single impact but also such cases, as mentioned above, where the desired effect of a single impact is achieved by the use of two or more impacts of lesser magnitude.

Although the screw shown in FIGURES 7 and 8 has a two-start thread, it will be understood that a screw having the more conventional single start thread may be used and also the tapered portion of the thread may be provided by having a shank which is cylindrical for the whole of its length up to the piercing point and which has the major part of its thread of full depth cylindrical form but with the remainder gradually reducing in depth towards the point to provide the tapered threaded portion.

In order for the maximum possible strength to be obtained in a fastening in which a self-tapping screw is inserted into sheet metal, there should be full thread engagement between the sheet and those threads of the screw which are engaged in the sheet; that is to say, the metal of the sheet should extend right down into the roots of those engaged threads and be in full engagement with the whole surface area of those threads. In the hitherto general practice, referred to above, in which a pilot hole is provided by a separate drilling, or punching-out operation, this full thread engagement is rarely achieved, for the reason that the operation of preforming the pilot hole necessarily results in removal of some of the metal of the sheet and, unless the pilot hole is made substantially undersize, there is not sufficient metal available in the surrounding wall of the pilot hole to fill up the engaged threads of the screw. In practice, where a large number of similar size self-tapping screws are being used, such as in assembly line operations, it is necessary to have a standard size pilot hole which will cater for the normal variations in diameters of the screws due to manufacturing tolerances. Also, considering the case of a screw which has a diameter on the upper limit of manufacturing tolerance, the standard size pilot hole must be sufficiently large to enable the leading end, or "start," of the thread of such upper limit screw to bite into the metal. Otherwise, when an attempt is made to drive the screw home it will merely spin round in the entrance to the pilot hole because the hole is too small for the thread of the screw to obtain the initial "bite." Thus, in practice, the standard size of pilot hole which will meet these requirements is such that, for the majority of screws of a certain size, the pilot hole is too large to provide sufficient metal to achieve full thread engagement between the screw thread and the metal sheet. This has always been a drawback to the use of self-tapping screws in sheet metal in cases where a good resistance to axial "pull-out" of the screw is required and the drawback is particularly acute in very thin metal sheet because in this case there may be only a single convolution of screw thread, or less than that, actually in threaded engagement with the sheet.

With the method according to this invention, however, it have been observed in practice so far that, when driving a plurality of identical screws into metal sheet of uniform thickness, with the tool set to deliver an impact which is always within the limits for the preferred maximum permissible impact and the minimum permissible impact, a majority of the screws achieve full thread engagement with the metal sheet. This will be understood from the following explanation.

As will be observed from FIGURE 7, instead of being removed, as happens with drilling or punching-out, the metal of the sheet is displaced in the direction of movement of the screw and compressed. In effect, an annular collar of metal, concentric with the axis of the screw, is displaced in the direction of movement of the screw and some of this appears as an annular bulge 328 on the rear surface of the sheet. Thus, considering FIGURE 7, when the tool is operated to rotate the screw and drive it home so that the thread on the cylindrical shank 301 enters the sheet, the said annular collar of metal is further deformed and displaced and metal flows into the spaces between the threads. The action of the threads upon the metal can be described as extruding of the metal into the spaces between the threads, the main direction of flow of the metal being in the radially inwards direction and some flow of metal taking place in the axial direction of movement of the screw to increase the extent of protrusion of the annular bulge 328. Under this extruding action of the thread, the metal escapes into the unrestricted spaces which are available, the majority of the metal moving radially inwards into the roots of the threads and some metal moving axially in the direction of advancement of the screw. It has also been observed in practice that, just before the head 300 engages the sheet, a slight annular bulge of metal becomes apparent on the front face of the sheet in the region of the initial bell-mouth 329 which bulge is flattened when the head of the screw is driven firmly home. This appearance of displaced metal on the front face of the sheet clearly indicates that the extruding action of the thread is of such magnitude as to cause some metal to be displaced rearwardly in the opposite direction to the direction of advancement of the screw. This latter effect is even more pronounced in the case (FIGURE 8) where the initial impact given to the screw is the minimum permissible, so that in the case of FIGURE 8 even more metal is available to fill up the spaces between the threads when the screw is driven home than is the case with FIGURE 7.

The advantageous operative combination between a tool as described and claimed herein, and a self-tapping screw having a recess, slot, socket, or other form of bit-engaging shape for its head, amounts, in effect, to a tool for piercing a hole in a sheet metal workpiece and forming an internal thread in such hole with the aid of an expendable piercing and threading bit (i.e. the screw which becomes detached from the tool after it has completed its functions of piercing and threading). The engagement between the head of the expendable bit (i.e. the screw) and the screwdriver bit is a separable engagement which needs only to provide for the temporary retainment of the expendable bit in position during piercing and threading together with a torque-transmitting connection between the two. For example, the screwdriver bit may comprise a socket for engaging over the head of a screw.

What I claim then is:

1. A tool for applying self-tapping screws to a workpiece, comprising a body, a screwdriver bit rotatably and slidably mounted in said body, first power means within the body for rotating said bit, an impact member slidably mounted within said body, and second power means for driving said impact member into engagement with said screwdriver bit to deliver an impact causing the screwdriver bit to slide in the body and transmit an impact to a screw, said second power means being operable to enable a desired number of individual impacts to be delivered without significant rotation of the screw.

2. A tool for applying self-tapping screws to a workpiece, comprising a body, a screwdriver bit rotatably and slidably mounted in said body, first power means within said body for rotating said bit, a cylinder provided within said body, an impact member slidably mounted within said body and comprising a piston forming part of said impact member and slidingly mounted within said cylinder, and second power means supplying air under pressure to said cylinder to act on said piston for driving said impact member into engagement with said screwdriver bit to deliver an impact causing the screwdriver bit to slide in the body and transmit an impact to a screw, said second power means being operable to enable a desired number of individual impacts to be delivered to the screw.

3. The tool defined in claim 2, wherein the first power means includes an air-driven motor mounted within the body, and means transmitting the drive from said motor to said body for rotating said bit.

4. A tool for applying self-tapping screws to a workpiece, comprising a body, a screwdriver bit having an axis and being rotatably and slidably mounted in said body, power-operated means within the body for rotating said bit, a cylinder having a forward and a rear end, the cylinder being mounted within said body in axial alignment with and to the rear of said bit, a piston having a forward face and a rear face, the piston being slidably mounted in said cylinder, an impact member extending from the forward face of said piston, said body defining a first chamber in free communication with the forward end of said cylinder, said body defining a second chamber, a wall separating said two chambers and extending across the rear end of said cylinder, said wall having a passage therethrough providing communication between said second chamber and the rear end of the cylinder adjacent the rear face of the piston, means for supplying air under pressure selectively to said chambers, and valve control means for controlling the admission of air to, and exhaust of air from, said chambers.

5. The tool defined in claim 4, further comprising a sealing member fitted to the rear face of said piston, a raised sealing surface formed around said passage on said wall, said sealing member being in sealing engagement with said sealing surface in a retracted position of the piston, said valve control means being arranged for supplying air under pressure to said second chamber and simultaneously exhausting air from said first chamber, to accelerate the piston from the retracted position at the rear end of the cylinder, and for supplying air under pressure to said first chamber whilst simultaneously exhausting air from said second chamber to return the piston to the retracted position.

6. A tool for applying self-tapping screws to a workpiece, comprising a body, a screwdriver bit having an axis and rotatably and slidably mounted in said body, a first power means comprising a motor having a rotating driving shaft within the body, an open-ended sleeve having an axis and being rotatably mounted within the body in axial alignment with the screwdriver bit, gearing between said driving shaft and said sleeve for rotating the sleeve about its axis, clutch means between said sleeve and the screwdriver bit for transmitting rotary motion from the sleeve to the bit, an impact member slidably mounted within said body, a shaft forming part of said impact member and arranged to move axially through said sleeve to deliver an impact to the bit and second power means driving said impact member towards the bit, the second power means being operable to enable a desired number of individual impacts to be delivered to the screw.

7. The tool defined in claim 4, wherein said first body has a main part defining the first chamber and a handgrip part defining said second chamber and secured to the main body part at a rear end thereof.

8. A tool for applying self-tapping screws to a workpiece, comprising a body, a screwdriver bit having an axis and rotatably and slidably mounted in said body, a motor having a rotating driving shaft within the body, an open-ended sleeve having an axis and being rotatably mounted within the body in axial alignment with the screwdriver bit, gearing between said driving shaft and said sleeve for rotating the sleeve about its axis, clutch means between said sleeve and the screwdriver bit for transmitting rotary motion from the sleeve to the bit, a cylinder within said body, an impact member slidably mounted within said body, a shaft forming part of said impact member and arranged to move axially through said sleeve to deliver an impact to the bit, a piston on said impact member shaft and operating within said cylinder, and means for supplying air under pressure to act on said piston to drive said impact member towards the bit.

9. The tool defined in claim 8, wherein the cylinder has a forward and a rear end, the cylinder being mounted within said body in axial alignment with and to the rear of said bit, said body defining a first chamber in free communication with the forward end of said cylinder, said body defining a second chamber, a wall separating said two chambers and extending across the rear end of said cylinder, said wall having a passage therethrough providing communication between said second chamber and the rear end of the cylinder adjacent the rear face of the piston, means for supplying air under pressure selectively to said chambers, and valve control means for controlling the admission of air to and exhaust of air from said chambers.

10. The tool defined in claim 9, further comprising a sealing member fitted to the rear face of said piston, a raised sealing surface formed around said passage on the wall, said sealing member being in sealing engagement with said sealing surface in a retracted position of the piston, said valve control means being arranged for supplying air under pressure to said second chamber and simultaneously exhausting air from said first chamber, to accelerate the piston from the retracted position at the rear end of the cylinder, and for supplying air under pressure to said first chamber whilst simultaneously exhausting air from said second chamber to return the piston to the retracted position.

11. A tool for piercing, and internally threading, a hole in a sheet-metal workpiece, comprising a body, a screwdriver member having an axis and being rotatably and slidably mounted in said body, first power means within said body for rotating said screwdriver member about said axis, an expendable piercing and threading bit releasably and non-rotatably engageable with said screwdriver member, an impact member mounted within said body for slidable movement in the axial direction, second power means for driving said impact member into engagement with said screwdriver member, to deliver an impact in the axial direction to said screwdriver member, said second power means being operable to enable a desired number of individual impacts to be delivered, said piercing and threading bit comprising an externally threaded shank having an axis, a point at one end of said shank, a head at the other end of said shank, said head having a recess comprising a central cavity, four screwdriver wing engaging grooves radiating outwardly from said central cavity, each groove having substantially vertical side walls and, intermediate each two circumferentially adjacent grooves, a valley of V-form in cross-section sloping downwardly and inwardly with respect to the shank axis; said screwdriver member having an operative end engaging said bit, said end comprising a central core, four equi-angularly spaced wings radiating therefrom, each adapted to engage within one of the four radially extending grooves of said recess, the side faces of the wings being substantially vertical and the core at positions intermediate each two circumferentially adjacent wings being formed with an outwardly extending rib of V-form, the cross-section of which decreases in a downwards direction towards the end of the screwdriver member.

12. A tool for piercing and internally threading a metal workpiece, comprising a body, a screwdriver bit having an axis rotatably and slidably mounted in said body, power-operated means within the body for rotating said bit, an expendable piercing and threading bit releasably and non-rotatably engageable with said screwdriver bit, a cylinder within said body, an impact member slidably mounted within said body, a piston formed with said impact member and operating within said cylinder, and means for supplying air under pressure to act on said piston for driving said impact member into engagement with said screwdriver bit to deliver an impact in the axial direction of the screwdriver bit, said piercing and threading bit comprising an externally threaded shank, a point at one end of said shank and a head at the other end, said head being shaped for non-rotative, axially separable engagement with said screwdriver bit.

13. The tool defined in claim 11, wherein said body has a main part defining a first chamber, a secondary body part secured to the main body part at a rear end thereof and defining said second chamber, and further comprising a hand-grip part secured to a main body part.

14. A tool for piercing, and internally threading a hole in a sheet-metal workpiece, comprising a body, a screwdriver member having an axis and being rotatably and slidably mounted in said body, first power means within said body for rotating said screwdriver member, an expendable piercing and threading bit releasably engageable with said screwdriver member, an impact member slidably mounted within said body, second power means for driving said impact member into engagement with said screwdriver member, to deliver an impact in the axial direction to said screwdriver member, said second power means being operable to enable a desired number of individual impacts to be delivered, said piercing and threading bit comprising an externally threaded shank, a point at one end of said shank, and a head at the other end of said shank, said head being shaped for non-rotative, axially separable engagement with said screwdriver bit.

15. A method of inserting a succession of identical threaded fasteners into a sheet metal workpiece of predetermined uniform thickness comprising the steps of:
 (a) providing a plurality of identical threaded fasteners each embodying a cylindrical threaded shank having a full thread thereon and having a tapered threaded portion which terminates in an unthreaded metal piercing point,
 (b) bringing each of said fasteners into successive non-rotatable engagement with a power-rotated screwdriver bit operatively connected with a power driven impact member movable in the axial direction of the screwdriver bit, and placing the piercing point of each fastener successively on the workpiece,
 (c) impacting said impact member against said screwdriver bit to subject each fastener successively to the same predetermined impact of magnitude great enough to advance the piercing point into the workpiece to form a pilot hole therein which is of a diameter sufficiently large to receive and engage with the start of the screw thread on the tapered threaded portion, but of a magnitude not so great that less than 30% of the radial depth of the screw thread on the cylindrical shank portion will be in penetrating engagement with the wall of the impact formed pilot hole when the screw is rotatably driven and,
 (d) applying full driving torque to the bit, while exerting pressure thereon, to fully drive the fastener into thread forming engagement with said workpiece.

16. A method of inserting a succession of identical threaded fasteners into a sheet metal workpiece of predetermined uniform thickness comprising the steps of:
 (a) providing a plurality of identical threaded fasteners each embodying a cylindrical threaded shank having a full thread thereon and having a tapered threaded portion which terminates in an unthreaded metal piercing point,
 (b) bringing each of said fasteners into successive non-rotatable engagement with a power-rotated screwdriver bit operatively connected with a power driven impact member movable in the axial direction of the screwdriver bit, and placing the piercing point of each fastener successively on the workpiece,
 (c) impacting said impact member against said screwdriver bit to subject each fastener successively to the same predetermined impact of magnitude great enough to advance the piercing point into the workpiece to form a pilot hole therein which is of a diameter sufficiently large to receive and engage with the start of the screw thread on the tapered threaded portion, but of a magnitude not so great as to produce a pilot hole of maximum diameter so large in relation to the outside diameter of the full screw thread on the cylindrical shank as to result during the final driving of the fastener under its designed driving torque in the stripping of the screw thread formed on the interior of the hole during the final step of (d) applying full driving torque to the bit, while exerting pressure thereon, to fully drive the fastener into thread forming engagement with said workpiece.

17. A method of inserting a succession of identical threaded fasteners into a sheet metal workpiece of predetermined uniform thickness comprising the steps of:
- (a) providing a plurality of identical threaded fasteners each embodying a cylindrical shank provided with a two-start thread and a tapered unthreaded metal piercing point of four-sided pyramidal form, with the outer periphery of the screw thread tapering down to the base of said point and the starts of the thread coinciding with the ends of a diagonal at the base of the point,
- (b) bringing each of said fasteners into successive non-rotatable engagement with a power-rotated screwdriver bit operatively connected with a power driven impact member movable in the axial direction of the screwdriver bit; and placing the piercing point of each fastener successively on the workpiece,
- (c) impacting said impact member against said screwdriver bit to subject each fastener successively to the same predetermined impact of magnitude great enough to advance the piercing point into the workpiece to form a pilot hole therein, which is of a diameter sufficiently large to receive and engage with the starts of the screw thread on diametrically opposite sides of the fastener at the base of the point, but of a magnitude not so great as to produce a pilot hole of maximum diameter so large in relation to the outside diameter of the screw thread on the cylindrical shank as to result during the final driving of the fastener under its designed driving torque in the stripping of the screw thread formed on the interior of the hole during the final step of
- (d) applying full driving torque to the bit, while exerting pressure thereon to fully drive the fastener into thread forming engagement with said workpiece.

18. A method of inserting a succession of identical threaded fasteners into a sheet metal workpiece of predetermined uniform thickness comprising the steps of:
- (a) providing a plurality of identical threaded fasteners each embodying a cylindrical threaded shank having a full thread thereon and having a tapered threaded portion which terminates in an unthreaded metal piercing point,
- (b) bringing each of said fasteners into successive non-rotatable engagement with a power-rotated screwdriver bit operatively connected with a power driven impact member movable in the axial direction of the screwdriver bit, and placing the piercing point of each fastener successively on the workpiece,
- (c) impacting said impact member against said screwdriver bit to subject each fastener successively to the same predetermined impact of magnitude great enough to advance the piercing point into the workpiece to form a pilot hole therein which is of a diameter sufficiently large to receive and engage with the start of a screw thread on the tapered threaded portion, but of magnitude not so great that, for the majority at least of the fasteners inserted, the diameter of the pilot hole is so large in relation to the outside diameter of the full screw thread on the cylindrical shank as to result in less than full thread engagement being achieved between the full screw thread on the shank and the metal sheet during the final step of
- (d) applying full driving torque to the bit, while exerting pressure thereon to fully drive the fastener into thread forming engagement with said workpiece.

References Cited
UNITED STATES PATENTS

| | | | |
|---|---|---|---|
| 2,990,187 | 6/1961 | Amundsen et al. | 173—29 |
| 2,990,739 | 7/1961 | Zifferer | 173—29 |
| 1,162,889 | 12/1915 | Thiele | 173—48 |
| 2,223,727 | 12/1940 | Homen | 173—48 |
| 3,212,590 | 10/1965 | Hoza | 81—52.3 |

DONALD R. SCHRAN, *Primary Examiner.*

R. J. ZLOTNIK, *Assistant Examiner.*